United States Patent [19]
Bounds et al.

[11] Patent Number: 5,709,346
[45] Date of Patent: Jan. 20, 1998

[54] CATCHER DEVICE FOR CONDIMENT MILL

[76] Inventors: William E. Bounds, deceased, late of Torrance, Calif.; by Helen J. Bounds, executrix, 3737 W. 240th St., Torrance, Calif. 90505

[21] Appl. No.: 635,738

[22] Filed: Apr. 22, 1996

[51] Int. Cl.⁶ .................................................. A47J 42/38
[52] U.S. Cl. .................. 241/169.1; 241/168; 241/285.3; 220/334
[58] Field of Search ........................... 241/169.1, 285.3, 241/100, 82; 220/343, 337, 334

[56] References Cited

U.S. PATENT DOCUMENTS

| | | | |
|---|---|---|---|
| 258,232 | 10/1882 | Krause | 241/82 X |
| 2,858,081 | 10/1958 | Sinkinson | 241/169.1 |
| 3,534,915 | 10/1970 | Clark | 241/285.3 X |
| 3,589,626 | 6/1971 | Saurer | 241/285.3 X |
| 3,610,304 | 10/1971 | Popeli | 241/169.1 X |
| 4,000,860 | 1/1977 | Gotham | 241/285.3 X |
| 4,155,843 | 5/1979 | Christianson | 241/169.1 X |
| 4,162,740 | 7/1979 | Jones | 220/337 X |
| 4,231,527 | 11/1980 | Bounds | 241/169.1 |
| 4,406,379 | 9/1983 | Anderson et al. | 220/337 X |
| 4,456,145 | 6/1984 | Frank | 220/334 X |
| 4,872,577 | 10/1989 | Smith | 220/334 X |
| 4,986,439 | 1/1991 | Ott et al. | 220/343 X |
| 5,042,731 | 8/1991 | Ford | 241/100 |

Primary Examiner—Daniel W. Howell
Assistant Examiner—Julie A. Krolikowski
Attorney, Agent, or Firm—Edward A. Sokolski

[57] ABSTRACT

A condiment mill has a catcher device installed on the bottom thereof opposite the grinder to catch and prevent the dropping of condiment grindings left over after the mill has been used. The catcher device is in the form of a receptacle and cover which is pivotally mounted on the mill. This cover is resiliently urged towards a closed position by a leaf spring and can be manually placed in retention in the closed position. The cover is manually brought to and retained in an open position for normal dispensing of the condiment.

4 Claims, 2 Drawing Sheets

5,709,346

CATCHER DEVICE FOR CONDIMENT MILL

BACKGROUND OF THE INVENTION

1. Field of the Invention

This invention relates to condiment mills and more particularly to such a mill having a catcher device installed thereon for catching excess condiment particles.

2. Description of the Related Art

In U.S. Pat. No. 4,231,527, issued Nov. 4, 1980 to William E. Bounds, the inventor of the present invention, a condiment mill is described which has a catcher device for catching excess ground condiment which may fall from the grinder after it has been used. In this device, the catcher device is retained in the same position at all times and the condiment can only be dispensed by holding the mill at an angle with the condiment falling sideways from the grinder. It is sometimes inconvenient for the user to be limited to such sideways dispensing of the condiment. Further, while the catcher prevents condiment from falling out when the grinder is held upright, such excess condiment will fall out if the grinder is tilted or shaken sideways.

BRIEF SUMMARY OF THE INVENTION

The condiment mill of the present invention provides an improvement over the prior art in enabling the full retention of excess ground condiment regardless of how the mill is oriented and even if it should be shaken. This end result is achieved by means of an improved catcher device. This catcher device is formed by a cover unit which is pivotally supported on the base of the mill. A leaf spring is fixedly attached to the base of the mill, this spring being fitted through a slot formed in the cover. The spring resiliently urges the cover towards a closed position against the bottom of the grinder housing. The cover is placed in its closed position by manually pressing it against the grinder whereat the end of the spring comes out of the slot and operates to retain the cover closed. The cover is manually retracted against the spring action to an open over center position where it is retained in place by the spring.

It is therefore an object of the invention to provide an improved cover for a condiment mill which catches ground particles which may inadvertently fall from the mill.

Other objects of the invention will become apparent in connection with the following description in conjunction with the accompanying drawings.

DETAILED DESCRIPTION OF THE INVENTION

Figure 1:
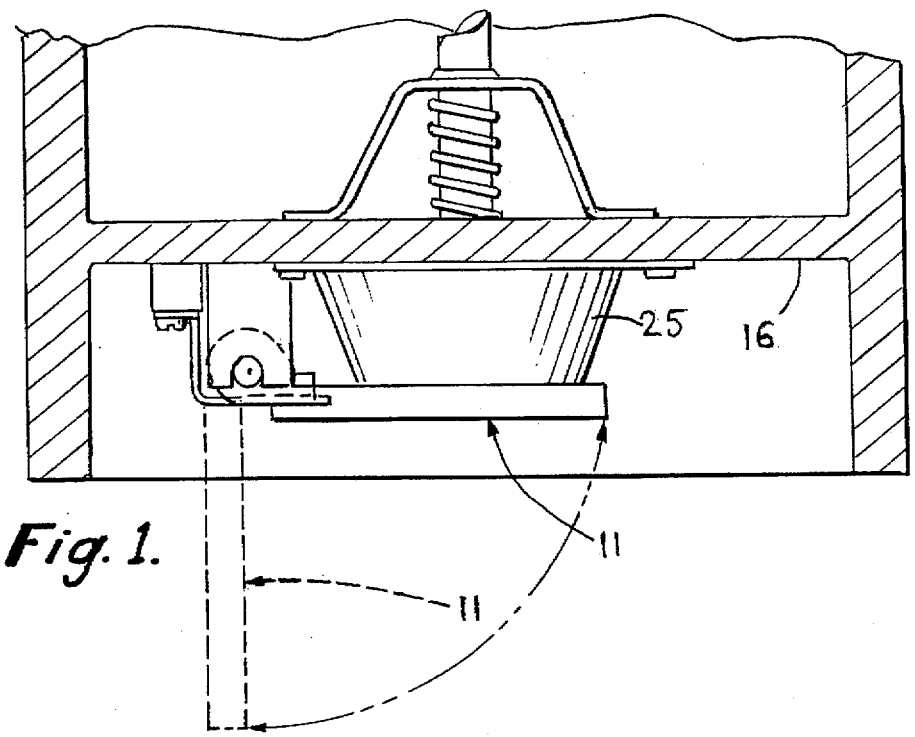
FIG. 1 is a side elevational view of a preferred embodiment of the invention.

Referring to the FIGS, a preferred embodiment of the invention is illustrated. The device of the present invention can be utilized with a condiment mill such as that described in the aforementioned U.S. Pat. No. 4,231,527, and the description of the mill described in this patent invention is incorporated herein by reference.

Cover 11 has a perimeter wall 11a around its edges thereby forming a container. Cover 11 has a pair of opposing arms 12a and 12b, each of these arms having a support rod 14 extending therefrom. Rods 14 fit into grooves formed in support posts 17 which are fixedly attached to the inner wall 16 of the base of the mill. The cover 11 is thus pivotally supported on wall 16 by means of rods 14 which fit into the grooves of posts 17.

Leaf spring 20 has three sections 20a, 20b, and 20c. Sections 20a and 20c are substantially parallel to each other while section 20b which joins sections 20 and 20c together runs substantially at right angles thereto. Spring 20 is supported on wall 16 by means of screw 28 which is used to attach section 20c to the wall. Cross arm 11b extends between opposing arms 12a and 12b. A slot 11c is formed between cross arm 11b and the rear section of wall 11a. Spring section 20a rests on cross arm 11b and in all but the closed position of the cover extends into slot 11c.

Figure 2:
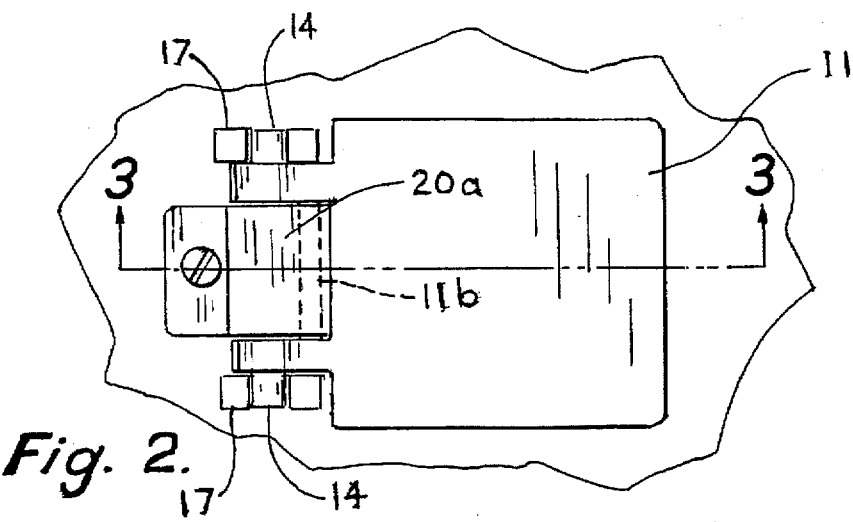
FIG. 2 is a bottom plan view of the preferred embodiment.
Figure 3:
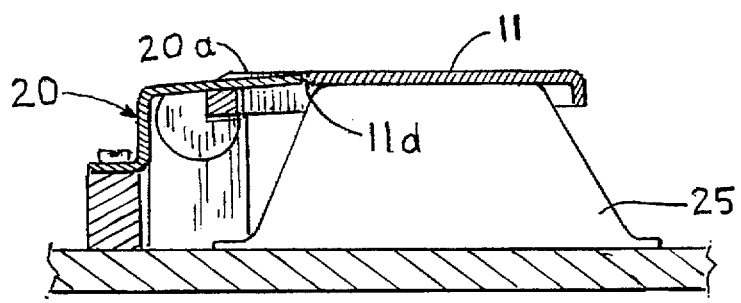
FIG. 3 is a cross sectional view taken along the plane indicated by 3—3 in FIG. 2.
Figure 4:
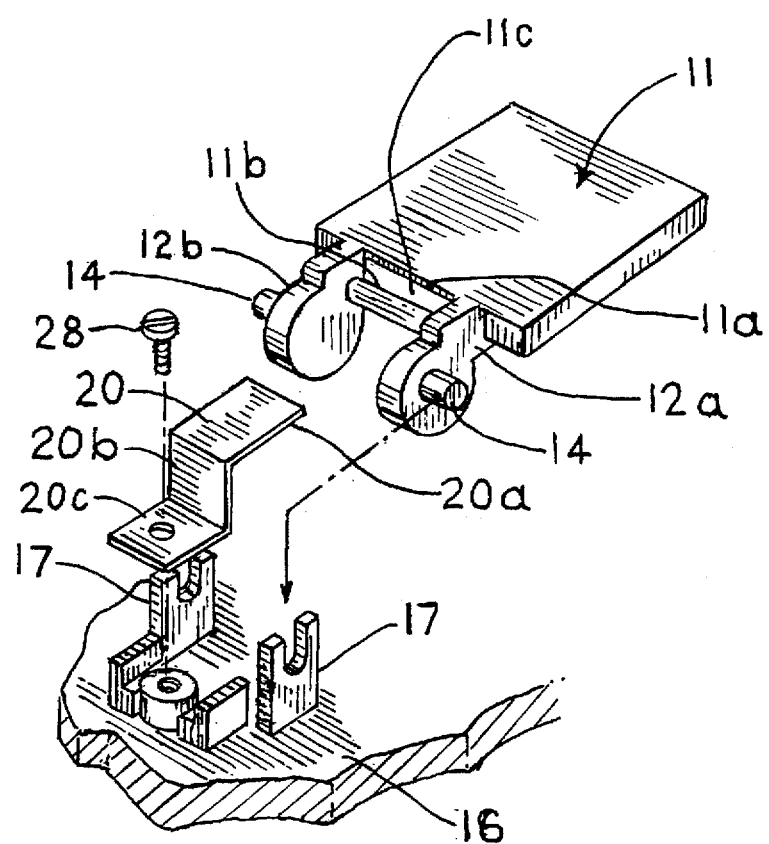
FIG. 4 is an exploded rear top perspective view of the preferred embodiment.

With the cover 11 in the closed position, as shown in FIGS. 1-3, the inner wall of such cover abuts against the bottom edge of the housing 25 of the mill grinder. In this closed position, spring section 20a is fully withdrawn from slot 11c and its edge, after having passed by beveled edge 11d of wall portion 11a, snaps into position in abutment against wall portion 11a. The cover must be manually pressed to this closed position. The cover is brought to the open position by manually retracting it away from housing 25 until spring section 20a is fully extended through slot 11c and the cover is in an over center position, as shown in FIG. 1. In this position, the spring firmly retains the cover in the open position by virtue of its abutment against the top surface of cross arm 11b.

While the invention has been described and illustrated in detail, it is to be clearly understood that this is intended by way of example only and is not to be taken by way of limitation, the scope of the invention being limited only by the terms of the following claims.

I claim:

1. A catcher device for catching condiment grinding from a condiment mill, said mill having a base portion and a grinder housing mounted on said base portion comprising:

a cover, means for pivotally supporting said cover on the base portion of the mill, and spring means mounted on the base portion of the mill for resiliently urging the cover towards a closed position opposite the grinder housing and for retaining said cover in an position when the cover is manually retracted to said open position, said spring means comprising a leaf spring having first and second sections which are substantially parallel to each other and are interconnected by a third section which is substantially normal to said first and second sections, said first spring section being attached to the base portion of the mill, said cover having a slot formed therein, said second spring section extending into said slot when the cover is other than in its closed position, said second spring section being withdrawn from said slot when said cover is in the closed position.

2. A catcher device for catching condiment grindings from a condiment mill, said mill having a base portion and a grinder housing mounted on said base portion comprising:

a pair of opposing support posts mounted on the mill base portion, each of said posts having a groove formed therein, a cover having a perimeter wall running around its edges, a slot being formed along one side of said perimeter wall, a pair of opposing arms extending from said cover, and a support rod extending from each of said opposing arms, said support rods being fitted into the grooves of said support posts for pivotal motion therein, and a leaf spring having first and second sections which are substantially parallel to each other and a third section interconnecting said first and second sections which is substantially normal said first and second sections, said first spring section being attached to the base portion of the mill, said second spring section fitting into the slot formed in said cover, whereby when the cover is manually placed in a closed position against the grinder housing, the second spring section is withdrawn from said slot and is in abutment against said one side of said perimeter wall, and when the cover is placed in an open position retracted from the grinder housing, the second spring section is fully extended through said slot.

3. The device of claim 2 wherein said cover has a cross arm portion forming one side of said slot, said second spring section abutting against said cross arm portion.

4. The device of claim 2 wherein said one side of said perimeter wall is beveled, to facilitate movement of said second spring section to a position in abutment against said one side of said perimeter wall.

* * * * *